(12) United States Patent
Wang et al.

(10) Patent No.: US 10,068,128 B2
(45) Date of Patent: Sep. 4, 2018

(54) FACE KEY POINT POSITIONING METHOD AND TERMINAL

(71) Applicant: Tencent Technology (Shenzhen) Company Limited, Shenzhen (CN)

(72) Inventors: Chengjie Wang, Shenzhen (CN); Jilin Li, Shenzhen (CN); Feiyue Huang, Shenzhen (CN); Yongjian Wu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/438,371

(22) Filed: Feb. 21, 2017

(65) Prior Publication Data

US 2017/0161551 A1 Jun. 8, 2017

Related U.S. Application Data

(63) Continuation of application No. PCT/CN2016/079602, filed on Apr. 18, 2016.

(30) Foreign Application Priority Data

May 29, 2015 (CN) .......................... 2015 1 0289727

(51) Int. Cl.
*G06K 9/00* (2006.01)
*G06T 7/20* (2017.01)
(Continued)

(52) U.S. Cl.
CPC ..... *G06K 9/00281* (2013.01); *G06K 9/00261* (2013.01); *G06K 9/00288* (2013.01);
(Continued)

(58) Field of Classification Search
CPC ........... G06K 9/00463; G06K 9/00449; G06K 9/00456; G06K 9/00469; G06K 9/4671;
(Continued)

(56) References Cited

U.S. PATENT DOCUMENTS

2009/0116749 A1 5/2009 Cristinacce et al.
2012/0087590 A1* 4/2012 Kato .................. G06K 9/00281
382/201

FOREIGN PATENT DOCUMENTS

CN 101877055 A 11/2010
CN 102262724 A 11/2011
(Continued)

OTHER PUBLICATIONS

International Search Report and Written Opinion to PCT Application No. PCT/CN2016/079602 dated Jul. 15, 2016 and concise explanation of Written Opinion to PCT/CN2016/079602 (10p).

*Primary Examiner* — Duy M Dang
(74) *Attorney, Agent, or Firm* — Brinks Gilson & Lione

(57) ABSTRACT

The present disclosure pertains to the field of image processing technologies and discloses a face key point positioning method and a terminal. The method includes: obtaining a face image; recognizing a face frame in the face image; determining positions of n key points of a target face in the face frame according to the face frame and a first positioning algorithm; performing screening to select, from candidate faces, a similar face whose positions of corresponding key points match the positions of the n key points of the target face; and determining positions of m key points of the similar face selected through screening according to a second positioning algorithm, m being a positive integer. In this way, the problem that positions of key points obtained by a terminal have relatively great deviations in the related technologies is resolved, thereby achieving an effect of improving accuracy of positioned positions of the key points.

20 Claims, 7 Drawing Sheets

(51) Int. Cl.
  *G06K 9/62* (2006.01)
  *G06K 9/52* (2006.01)

(52) U.S. Cl.
  CPC .............. *G06K 9/52* (2013.01); *G06K 9/6215* (2013.01); *G06T 7/20* (2013.01)

(58) Field of Classification Search
  CPC ............. G06K 9/6267; G06K 9/00281; G06K 9/00261; G06K 9/00288; G06K 9/52; G06K 9/6215; G06K 9/00087; G06K 9/00221; G06K 9/00577; G06K 9/00617; G06K 9/00624; G06K 9/00885; G06K 9/46; G06K 9/6202; G06K 9/6214; G06K 9/6232; G06K 9/6234; G06K 9/6235; G06K 9/6239; G06K 9/624; G06K 9/6244; G06K 9/6247; G06K 9/6248; G06K 9/6259; G06K 9/6284; G06F 17/30268; G06T 7/20
  See application file for complete search history.

(56) References Cited

FOREIGN PATENT DOCUMENTS

| | | |
|---|---|---|
| CN | 103824087 A | 5/2014 |
| CN | 104598936 A | 5/2015 |

* cited by examiner

FACE KEY POINT POSITIONING METHOD AND TERMINAL

RELATED APPLICATION

This application is a continuation application of PCT Patent Application No. PCT/CN2016/079602, filed on Apr. 18, 2016, which claims priority to Chinese Patent Application No. 2015102897270, filed on May 29, 2015, both of which are incorporated herein by reference in their entireties.

FIELD OF THE TECHNOLOGY

Embodiments of the present invention relate to the field of image processing technologies, and in particular, to a face key point positioning method and a terminal.

BACKGROUND OF THE DISCLOSURE

Face key point positioning is an important technology in face image researches. The technology has a direct effect on multiple face recognition-related image processing technologies such as face recognition, face attribute recognition (gender recognition, posture recognition, and age recognition), and face beautification.

A related face key point positioning method generally includes determining a face frame of a face by using a face detector, and performing positioning on the face according to an Explicit Shape Regression (ESR) positioning algorithm and the face frame to obtain key points of the face.

In a process of implementing embodiments of the present invention, the inventor finds that at least the following problem exists in related technologies: the positioning method greatly relies on positioning accuracy of a face frame, that is, when the face frame is positioned with a deviation, positions of key points obtained by a terminal also have relatively great deviations.

SUMMARY

To resolve the problem existing in the related technologies, embodiments of the present invention provide a face key point positioning method and a terminal. The technical solutions are as follows:

According to a first aspect, a face key point positioning method is provided, and the method includes:

obtaining a face image;

recognizing a face frame in the face image;

determining positions of n key points of a target face in the face frame according to the face frame and a first positioning algorithm, n≥3, and the first positioning algorithm being a positioning algorithm that allows deviations between the determined positions of the n key points and actual positions thereof to fall within a first deviation range when the face frame is positioned with a deviation;

performing screening to select, from candidate faces, a similar face whose positions of corresponding key points match the positions of the n key points of the target face;

determining positions of m key points of the similar face selected through screening according to a second positioning algorithm, m being a positive integer, and the second positioning algorithm being a positioning algorithm that allows deviations between the determined positions of the m key points and actual positions thereof to fall within a second deviation range when the face frame is accurately positioned; and determining a positioning result for the target face according to at least one positioning result for the similar face.

According to a second aspect, a face key point positioning apparatus is provided, and the apparatus includes:

an obtaining module, configured to obtain a face image;

a first determining module, configured to determine a face frame in the face image obtained by the obtaining module;

a second determining module, configured to determine positions of n key points of a target face in the face frame according to the face frame determined by the first determining module and a first positioning algorithm, n≥3, and the first positioning algorithm being a positioning algorithm that allows deviations between the obtained positioned positions of the n key points and actual positions thereof to fall within a first deviation range when the face frame is positioned with a deviation;

a face screening module, configured to perform screening to select, from candidate faces, a similar face whose positions of corresponding key points match the positions of the n key points of the target face;

a third determining module, configured to determine positions of m key points of the similar face selected through screening according to a second positioning algorithm, m being a positive integer, and the second positioning algorithm being a positioning algorithm that allows deviations between the obtained positioned positions of the key points and actual positions thereof to fall within a second deviation range when the face frame is accurately positioned; and a positioning result determining module, configured to determine a positioning result for the target face according to at least one positioning result for the similar face that is determined by the third determining module.

According to a third aspect, a terminal is provided, and the terminal includes:

one or more processors, and a memory, one or more programs being stored in the memory, the one or more programs being configured to be executed by the one or more processors, and the one or more programs including instructions used for performing the following operations:

obtaining a face image;

recognizing a face frame in the face image;

determining positions of n key points of a target face in the face frame according to the face frame and a first positioning algorithm, n≥3, and the first positioning algorithm being a positioning algorithm that allows deviations between the obtained positioned positions of the key points and actual positions thereof to fall within a first deviation range when the face frame is positioned with a deviation;

performing screening to select, from candidate faces, a similar face whose positions of corresponding key points match the positions of the n key points of the target face;

determining positions of m key points of the similar face selected through screening according to a second positioning algorithm, m being a positive integer, and the second positioning algorithm being a positioning algorithm that allows deviations between the obtained positioned positions of the key points and actual positions thereof to fall within a second deviation range when the face frame is accurately positioned; and determining a positioning result for the target face according to at least one positioning result for the similar face.

Beneficial effects of the technical solutions provided in the embodiments of the present invention are:

A face frame in a face image is recognized; n key points of a target face in the face frame are positioned according to a first positioning algorithm that allows positioning deviations of the key points to fall within a first deviation range when the face frame is positioned with a deviation; a similar face whose positions of corresponding key points match positioned positions of the n key points is selected from candidate faces through screening; then, positions of key points of the similar face are positioned according to a second positioning algorithm that allows positioning deviations of the key points to fall within a second deviation range when the face frame is accurately positioned; and a positioning result for the target face is determined according to at least one positioning result for the similar face. In this way, the problem that positions of key points obtained by a terminal have relatively great deviations in the related technologies is resolved, thereby achieving an effect of improving accuracy of positioned positions of the key points.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings. Apparently, the described embodiments are merely some embodiments rather than all embodiments of the present invention. All other embodiments obtained by a person of ordinary skill in the art based on the embodiments of the present invention without creative efforts shall fall within the protection scope of the present disclosure.

Figure 1:
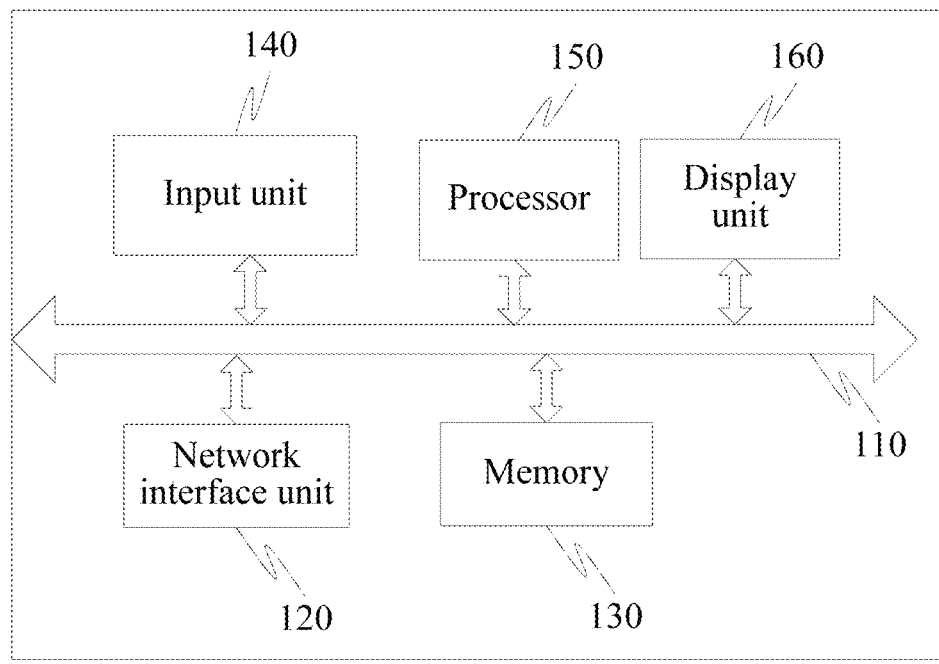
FIG. 1 is a schematic structural diagram of a terminal according to an embodiment of the present invention.

Referring to FIG. 1, FIG. 1 is a schematic structural diagram of a terminal according to an embodiment of the present invention. The terminal may include a bus 110, and a network interface unit 120, a memory 130, an input unit 140, a processor 150, and a display unit 160 that are connected to the bus 110. The memory 130 stores one or more programs, and the processor 150 may be configured to execute the one or more programs stored in the memory 130 to perform the following operations.

The processor 150 is configured to obtain a face image from the memory 130 or obtain the face image from another terminal via the network interface unit 120.

The processor 150 is further configured to: recognize a face frame in the face image; determine positions of n key points of a target face in the face frame according to the face frame and a first positioning algorithm, $n \geq 3$, and the first positioning algorithm being a positioning algorithm that allows deviations between the obtained positioned positions of the key points and actual positions thereof to fall within a first deviation range when the face frame is positioned with a deviation; perform screening to select, from candidate faces, a similar face whose positions of corresponding key points match the positions of the n key points of the target face; determine positions of m key points of the similar face selected through screening according to a second positioning algorithm, m being a positive integer, and the second positioning algorithm being a positioning algorithm that allows deviations between the obtained positioned positions of the key points and actual positions thereof to fall within a second deviation range when the face frame is accurately positioned; and determine a positioning result for the target face according to a positioning result for the similar face.

Figure 3A:
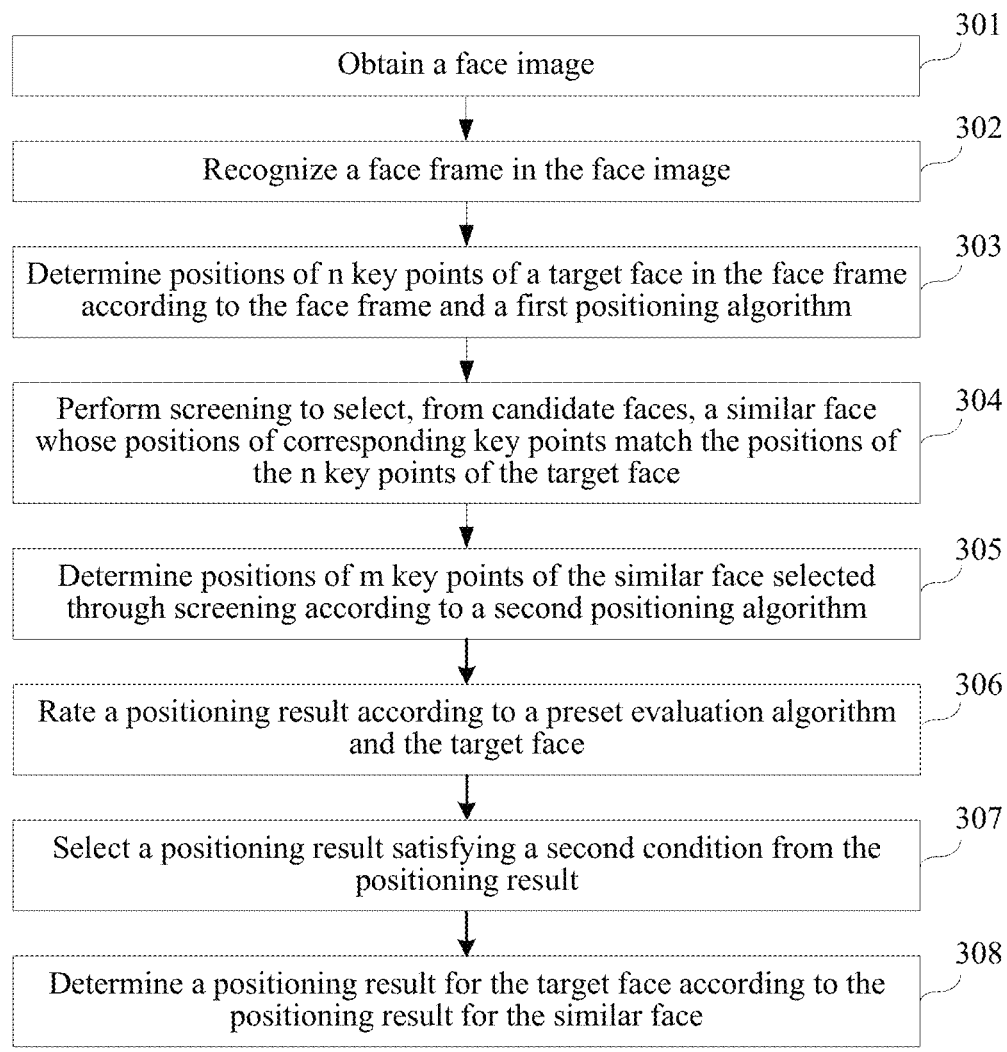
FIG. 3A is a method flowchart of a face key point positioning method according to another embodiment of the present invention.

Optionally, the processor 150 may be configured to execute the one or more programs stored in the memory 130 to perform various operations in FIG. 3A.

To sum up, by means of the terminal provided in this embodiment, a face frame in a face image is recognized; n key points of a target face in the face frame are positioned according to a first positioning algorithm that allows positioning deviations of the key points to fall within a first deviation range when the face frame is positioned with a deviation; a similar face whose positions of corresponding key points match positioned positions of the n key points is selected from candidate faces through screening; then, positions of key points of the similar face are positioned according to a second positioning algorithm that allows positioning deviations of the key points to fall within a second deviation range when the face frame is accurately positioned; and a positioning result for the target face is determined according to a positioning result for the similar face. In this way, the problem that positions of key points obtained by a terminal have relatively great deviations in the related technologies is resolved, thereby achieving an effect of improving accuracy of positioned positions of the key points.

Figure 2:
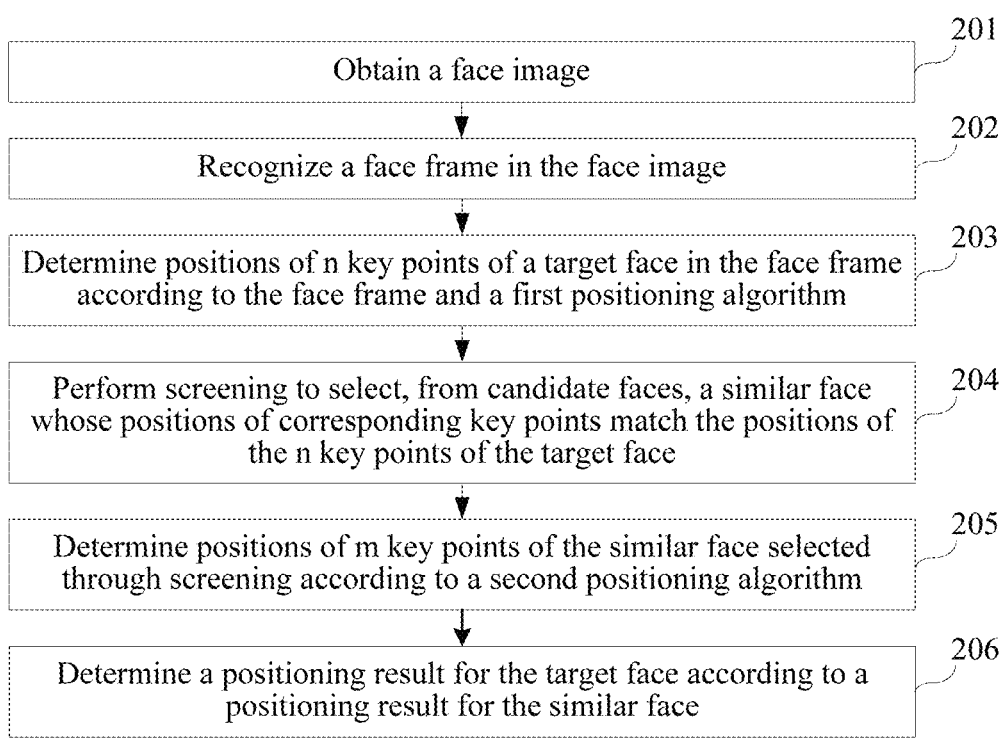
FIG. 2 is a method flowchart of a face key point positioning method according to an embodiment of the present invention.

Referring to FIG. 2, FIG. 2 is a method flowchart of a face key point positioning method according to an embodiment of the present invention. The face key point positioning method includes:

Step 201: Obtain a face image.

Step 202: Recognize a face frame in the face image.

Step 203: Determine positions of n key points of a target face in the face frame according to the face frame and a first positioning algorithm.

In step 203, $n \geq 3$, and the first positioning algorithm is a positioning algorithm that allows deviations between the obtained positioned positions of the key points and actual positions thereof to fall within a first deviation range when the face frame is positioned with a deviation.

Step 204: Perform screening to select, from candidate faces, a similar face whose positions of corresponding key points match the positions of the n key points of the target face.

Step 205: Determine positions of m key points of the similar face selected through screening according to a second positioning algorithm.

In step 205, m is a positive integer. The second positioning algorithm is a positioning algorithm that allows deviations between the obtained positioned positions of the key points and actual positions thereof to fall within a second deviation range when the face frame is accurately positioned. Optionally, deviations between the obtained positioned positions of the key points and actual positions thereof exceed the first deviation range when the face frame is positioned with a deviation. Generally, the second positioning algorithm is different from the first positioning algorithm.

Step 206: Determine a positioning result for the target face according to a positioning result for the similar face.

The key points in this embodiment may be two pupils, the nasal tip, two corners of the mouth, the eyebrows, the middle area between the eyebrows, two cheeks, the chin, or the lower jaw of the face. This is not limited in this embodiment.

To sum up, according to the face key point positioning method provided in this embodiment, a face frame in a face image is recognized; n key points of a target face in the face frame are positioned according to a first positioning algorithm that allows positioning deviations of the key points to fall within a first deviation range when the face frame is positioned with a deviation; a similar face whose positioned positions of corresponding key points match positions of the n key points is selected from candidate faces through screening; then, positions of key points of the similar face are positioned according to a second positioning algorithm that allows positioning deviations of the key points to fall within a second deviation range when the face frame is accurately positioned; and a positioning result for the target face is determined according to a positioning result for the similar face. In this way, the problem that positions of key points obtained by a terminal have relatively great deviations in the related technologies is resolved, thereby achieving an effect of improving accuracy of positioned positions of the key points.

Referring to FIG. 3A, FIG. 3A is a method flowchart of a face key point positioning method according to another embodiment of the present invention. The face key point positioning method includes:

Step 301: Obtain a face image.

When a terminal needs to position key points of a target face in a face image, the terminal may obtain the face image.

Step 302: Recognize a face frame in the face image.

Optionally, the terminal may determine the face frame in the face image by using a face detector. Optionally, the terminal may obtain coordinates of the face frame.

Step 303: Determine positions of n key points of a target face in the face frame according to the face frame and a first positioning algorithm.

The terminal may match the positions of the n key points of the target face in the face frame by using a positioning model of the first positioning algorithm. The n key points are pre-trained key points in the positioning model, and n≥3.

Optionally, the n key points may include two pupils, the nasal tip, and two corners of the mouth of the face. Moreover, positioning accuracy of the pupils and the corners of the mouth is relatively high and positioning complexity is relatively low. Therefore, to improve positioning accuracy of the terminal and reduce positioning complexity of the terminal, the n key points may include the two pupils and the two corners of the mouth of the face. For example, when n is 3, three key points may be the two pupils and one of the two corners of the mouth.

Optionally, to improve accuracy of the positions of the n key points that are obtained through positioning according to the first positioning algorithm, the first positioning algorithm may be a positioning algorithm that allows deviations between the obtained positioned positions of the key points and actual positions thereof to fall within a first deviation range when the face frame is positioned with a deviation.

Specifically, a Convolutional Neural Network (CNN) algorithm still has steady output when the face frame is positioned with a deviation (that is, accuracy of a positioning result of the CNN falls within the first deviation range). Therefore, the first positioning algorithm in this embodiment may be the CNN algorithm. Similarly, the first positioning algorithm may also be an Active Shape Model (ASM) algorithm, an Active Appearance Model (AAM) algorithm, or a Supervised Descent Method (SDM) algorithm. This is not limited in this embodiment.

Figure 3B:
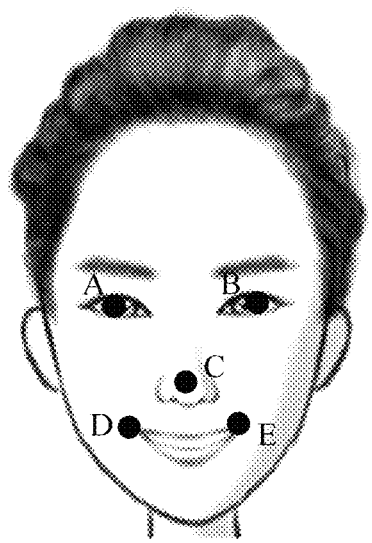
FIG. 3B is a schematic diagram of positions of n key points that are positioned by using a first positioning algorithm according to the another embodiment of the present invention.

An example in which the first positioning algorithm is the CNN algorithm and n is 5 is used. The terminal may position positions of corresponding five key points of the target face by using a five-point positioning model obtained through pre-training in the CNN algorithm. Referring to FIG. 3B, the terminal may obtain through positioning the positions of the five key points represented by A, B, C, D, and E in FIG. 3B.

Figure 3C:
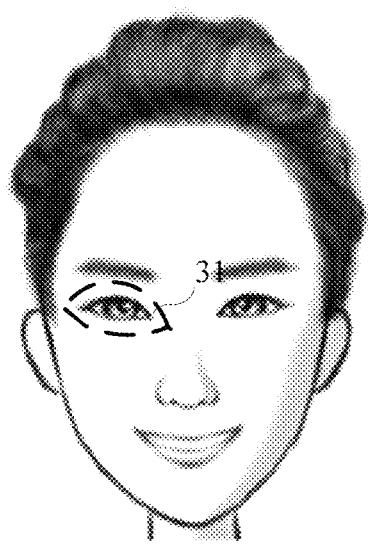
FIG. 3C is a schematic diagram of a first deviation range involved in the face key point positioning method according to the another embodiment of the present invention.

Optionally, the first deviation range refers to a range in which distances between the positioned positions and the actual positions are less than a preset threshold. For example, referring to FIG. 3C, the first deviation range may be a range 31 around the eye shown in the drawing.

It should be noted that, the positioning model of the first positioning algorithm may be a pre-trained model. Training steps of the positioning model may include: obtaining, by the terminal, multiple training faces and coordinates of manually marked key points of each training face (for example, two pupils, the nasal tip, and two corners of the mouth of the face), and determining the positioning model for the n key points according to the training faces and coordinates of each key point.

Step 304: Perform screening to select, from candidate faces, a similar face whose positions of corresponding key points match the positions of the n key points of the target face.

Optionally, the terminal may select j candidate faces from face models, and then perform screening to select, from the j candidate faces, a similar face whose positions of corresponding key points match the positions of the n key points of the target face.

Optionally, this step may include:

First, for each candidate face, positions of i key points of the n key points of the target face are aligned with positions of corresponding key points of the candidate face, where a position of each of the n key points is marked in each candidate face, and i<n.

An example in which there are 2j candidate faces and i is 2 is used. The terminal may overlap positions of two key points of the target face with positions of corresponding key points of each candidate face. Optionally, when the positions of the two key points of the target face cannot directly overlap with the positions of the corresponding key points of the candidate face, the terminal may also first perform operations, such as translation, scaling, or rotation, on the candidate face to make them overlap.

Optionally, the terminal may overlap positions of the two pupils of the target face with positions of two pupils of the candidate face.

Second, a distance between a remaining key point of the n key points and a position of a corresponding key point of the candidate face is calculated.

After the foregoing alignment, the terminal may calculate a distance between a remaining key point of the n key points of the target face and a corresponding key point of the candidate face.

Optionally, when there are at least two remaining key points, the terminal may calculate a distance between each of the at least two remaining key points and a corresponding key point of the candidate face, or calculate distances between some of the at least two remaining key points and corresponding key points of the candidate face.

Figure 3D:
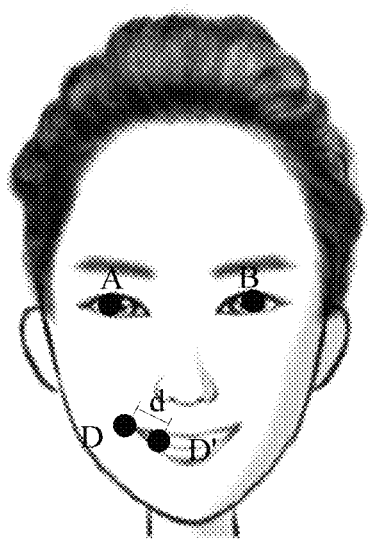
FIG. 3D is a schematic diagram showing performing screening to select a similar face according to the another embodiment of the present invention.

For example, an example in which the terminal calculates a distance between one of the remaining key points and a corresponding key point of the candidate face is used. Referring to FIG. 3D, after the terminal overlaps the pupils of the target face with the pupils of the candidate face, the terminal may calculate a distance d between a position of the right corner D of the mouth of the target face and a position of the right corner D' of the mouth of the candidate face.

Third, a face satisfying a first condition is selected from the candidate faces through screening as the similar face, where the first condition includes: the distance being less than a first threshold, or ranking the bottom N after ranking is performed in descending order by distance, or ranking the top N after ranking is performed in ascending order by distance.

Thereafter, the terminal may select a similar face satisfying a first condition from the 2j candidate faces.

Specifically, a smaller distance calculated by the terminal indicates a higher similarity between a corresponding candidate face and the target face. Therefore, the terminal may select a candidate face having a calculated distance less than a first threshold from the 2j candidate faces.

Similarly, the terminal may also perform ranking according to calculated distances in descending order and select candidate faces ranking the bottom N. Alternatively, the terminal performs ranking according to calculated distances in ascending order and selects candidate faces ranking the top N. N is a positive integer.

After the terminal selects a candidate face, the terminal may determine that the selected face is a similar face of the target face.

It should be further noted that, the candidate faces in this embodiment are faces obtained by the terminal through pre-training. Training steps of the candidate faces may include: initiating, by the terminal, a face model of each training face according to coordinates of manually marked key points of the training face; determining positions of n key points of the training face according to the positioning model of the first positioning algorithm; and aligning positions of at least two of the positioned n key points with positions of corresponding manually marked key points of the training face, selecting a face satisfying the first condition, and using the selected face as a candidate face. An implementation manner in which the terminal aligns key points and selects a face is similar to the manner of selecting a similar face in this step, and details are not described herein again.

Step 305: Determine positions of m key points of the similar face selected through screening according to a second positioning algorithm.

Thereafter, the terminal may position the m key points of the similar face selected through screening by using the second positioning algorithm, to obtain a positioning result for the m key points of the similar face, where m is a positive integer. Optionally, the terminal may match positions of the m key points of the similar face by using a positioning model of the second positioning algorithm.

Optionally, the second positioning algorithm is a positioning algorithm that allows deviations between the obtained positioned positions of the key points and actual positions thereof to fall within a second deviation range when the face frame is accurately positioned. Optionally, the second positioning algorithm may also be a positioning algorithm that allows deviations between the obtained positioned positions of the key points and actual positions thereof to exceed the first deviation range when the face frame is positioned with a deviation. Generally, the second positioning algorithm is different from the first positioning algorithm.

Specifically, an example in which the second positioning algorithm satisfies both the foregoing two conditions is used. An ESR algorithm can achieve precise positioning of key points by using local feature points, and an implicit constraint of the algorithm on relative positions of the key points still enables precise positioning in tough scenarios such as varying illumination and a locally covered face. Moreover, the algorithm greatly relies on accuracy of the face frame determined by the face detector and a posture of the target face, that is, when a position of the face frame deviates or the posture of the target face is greatly different from a posture of a pre-trained candidate face, positions of the key points that are positioned by using the ESR algorithm also have relatively great errors. Therefore, the second positioning algorithm in this embodiment may be the ESR algorithm. Similarly, the second positioning algorithm may also be the ESR algorithm, a CNN algorithm, or an SDM algorithm.

Optionally, for the ESR algorithm, a quantity of key points needed to be positioned can be flexibly changed. Therefore, after comprehensive consideration on positioning precision and flexibility, generally the ESR algorithm is selected as the second positioning algorithm in this embodiment.

It should be further noted that, the first deviation range in this embodiment may cover the second deviation range. Optionally, if positioning complexity of the first positioning algorithm increases with a quantity of key points needed to be positioned, both positioning precision and positioning complexity are taken into consideration, and the second deviation range may also be broader than the first deviation range, that is, some degree of positioning precision is sacrificed to reduce the positioning complexity of the algorithm and improve the flexibility of the algorithm.

It should be further noted that, the positioning model of the second positioning algorithm may be a pre-trained model. Training steps of the model may include: obtaining, by the terminal, training faces and coordinates of manually marked key points (which are generally m key points needed to be positioned subsequently) of the training faces, and obtaining, through training, the positioning model for the second positioning algorithm according to the training faces and the coordinates of the key points of the training faces.

It should be further noted that, an example in which positions of m key points of a similar face are determined once by the terminal according to the second positioning algorithm. Optionally, to improve positioning accuracy, for a similar face, the terminal may perform positioning for multiple times according to the second positioning algorithm. This is not limited in this embodiment.

Step 306: Rate the positioning result according to a preset evaluation algorithm and the target face.

There is a negative correlation between the rating and an error between the positioning result and the target face.

Optionally, the terminal may rate the positioning result for the similar face by using a rating model in the preset evaluation algorithm. The preset evaluation algorithm may be a ListNet algorithm.

It should be further noted that, the rating model in the preset evaluation algorithm may be a model obtained by the terminal through pre-training. Training steps of the rating model may include: determining, by the terminal, positions of m key points of training faces by using the positioning model of the second positioning algorithm; calculating deviations between the determined positions of the m key points and positions of manually marked m key points of the training faces; rating the determined positions of the m key points according to the calculated deviations; and obtaining the rating model according to rating results and the corresponding positioning results for the m key points. A greater deviation brings a lower rating. Optionally, when the second positioning algorithm is an algorithm with randomness (when positioning is performed on a same face for multiple times according to the positioning algorithm, positions of m key points that are obtained at the multiple times of positioning are varied to some extent), for each training face, the terminal may also determine positions of m key points of the training face for multiple times by using the positioning model of the second positioning algorithm, and then calculate a root mean square error according to positioning results obtained at the multiple times of positioning and positions of manually marked m key points of the training face; perform normalization processing on the root mean square error (dividing the calculated root mean square error by a pupil distance, and performing truncation processing, that is, maintaining a value within the range of 1 to 10 unchanged, and recording a value greater than 10 as 10); and then perform rating according to a normalization result (a greater normalization result brings a lower rating).

Step 307: Select a positioning result satisfying a second condition from the positioning result.

A higher rating of a positioning result indicates higher positioning accuracy of the positioning result. Therefore, the terminal may select a positioning result satisfying the second condition from the positioning result. The second condition includes: a rating being higher than a second threshold, or ranking the top M after ranking is performed in descending order by rating, or ranking the bottom M after ranking is performed in ascending order by rating, M being a positive integer.

If there is no positioning result satisfying the second condition in the positioning result, the terminal may select another positioning result. This is not limited in this embodiment.

It should be noted that, step 306 and step 307 are optional steps, and may be performed or may not be performed during actual implementation. This is not limited in this embodiment.

Step 308: Determine a positioning result for the target face according to a positioning result for the similar face.

Optionally, this step may include the following two possible implementation manners:

a first manner: if there is one positioning result, determining that the positioning result for the similar face is the positioning result for the target face; and a second manner: if there are at least two positioning results, calculating a central position of at least two positions of each key point according to positions of key points in the at least two positioning results; determining that the calculated central position is a target position of the key point; and determining that a positioning result constituted by target positions of the key points is the positioning result for the target face.

Specifically, if there are at least two positioning results, the terminal may determine positions of each key point in the at least two positioning results, use a central position of the determined at least two positions as a target position of the key point, and determine that a positioning result constituted by target positions is the positioning result for the target face.

When there are two positioning results, the terminal may use a central point of two positions of each key point in the two positioning results as a target position. When there are at least three positioning results, the terminal may use a center of gravity position of at least two positions of each key point in at least two positioning results as a target position. This is not limited in this embodiment.

In addition, the case in which a positioning result is determined by using the foregoing determining method is merely used as an example in this embodiment. Optionally, when step 307 is performed, the terminal may also directly select a highest rated positioning result as the positioning result for the target face. This is not limited in this embodiment.

It should be further noted that, the training faces used in the training processes in this embodiment may be same training faces, or may be different training faces. This is not limited in this embodiment.

In a first application scenario of this embodiment, for a dynamic expression show, the terminal obtains a face image uploaded by a user, recognizes a face frame in the face image, positions key points of a face in the face frame by using the first positioning algorithm, and performs screening to select, from candidate faces according to positions of the positioned key points, a similar face matching the positions of the key points, and then the terminal may position key points of the similar face by using the second positioning algorithm, and determine a positioning result for the face in the face image according to a positioning result for the similar face. When the face frame is positioned with a deviation, position deviations of the key points of the first positioning algorithm fall within the first deviation range, that is, the first positioning algorithm has relatively high accuracy; therefore, accuracy of the similar face that is determined according to the positioned key points is also relatively high. Moreover, when the face frame is relatively accurately positioned, position deviations of positioned key points of the second positioning algorithm fall within the second deviation range. Therefore, by means of the foregoing method, the face in the face image can be accurately recognized, improving effects of a dynamic expression show that is made according to the recognized face.

In a second application scenario of this embodiment, in the image beautification field, after obtaining a face image of a user, the terminal can accurately position a face in the face image by using the foregoing key point positioning algorithms, and can then accurately perform buffing, whitening, freckle removing, and the like on a face area. Meanwhile, because key points are relatively accurately positioned, the terminal may perform corresponding beatification processing, such as automatic eyebrow-penciling, nose highlighting, lip-gloss—application, and false-eyelash—sticking, on various regions of the face according to a positioning result.

In a third application scenario of this embodiment, for a photo wall, the terminal also improves, by using the foregoing method, accuracy of positioning a face in a face image, and therefore improves recommendation accuracy when a friend is subsequently recommended according to the face image in the photo wall.

In a fourth application scenario of this embodiment, for a watermark camera, the terminal improves, by using the foregoing method, accuracy of positioning key points of a face, so that the terminal may accurately calculate shapes of facial features and proportions of the facial features according to positioned key points, and thereby accurately evaluate the attractiveness of the face. Moreover, the terminal may also determine through recognition whether the face belongs to a male or a female according to a positioning result of key points and face proportions of male and female.

In a fifth application scenario of this embodiment, for a creativity camera, the terminal accurately positions of key points of a face by using the foregoing method, accurately constructs a three-dimensional model of the face according to the positions of the key points, and thereby automatically adds three-dimensional effects, for example, adds a three-dimensional tattoo, to the face.

To sum up, according to the face key point positioning method provided in this embodiment, a face frame in a face image is recognized; n key points of a target face in the face frame are positioned according to a first positioning algorithm that allows positioning deviations of the key points to fall within a first deviation range when the face frame is positioned with a deviation; a similar face whose positioned positions of corresponding key points match positions of the n key points is selected from candidate faces through screening; then, positions of key points of the similar face are positioned according to a second positioning algorithm that allows positioning deviations of the key points to fall within a second deviation range when the face frame is accurately positioned; and a positioning result for the target face is determined according to a positioning result for the similar face. In this way, the problem that positions of key points obtained by a terminal have relatively great deviations in the related technologies is resolved, thereby achieving an effect of improving accuracy of positioned positions of the key points.

In this embodiment, initial positioning is performed by using a first positioning algorithm, and then second positioning is performed by using a second positioning algorithm, so that on the premise of some degree of positioning accuracy ensured by the initial positioning, positions of key points positioned according to the second positioning algorithm are also relatively accurate.

Although the first positioning algorithm still has some degree of positioning precision when a face frame is positioned with a deviation, positioning complexity of the first positioning algorithm generally increases with a quantity of key points needed to positioned. Although the second positioning algorithm has relatively favorable positioning precision when a face frame is accurately positioned and has a relatively great positioning error when the face frame is positioned with a deviation, a quantity of key points that can be positioned according to the second positioning algorithm can be adjusted as needed. Therefore, in this embodiment, positioning is performed by using both the first positioning algorithm and the second positioning algorithm, not only ensuring some degree of positioning precision, but also ensuring that a quantity of key points needed to be positioned can be flexibly adjusted in the positioning method, and thereby improving flexibility of the foregoing face key point positioning method.

In addition, when the first positioning algorithm or the second positioning algorithm is an algorithm with randomness, when a terminal trains a positioning model of the positioning algorithm, the terminal may select a small quantity of training faces, and then perform training by positioning a same training face for multiple times. In this way, the requirement for a quantity of training samples in a training process is reduced, complexity of manually marking key points of training faces is decreased, and manpower costs of trainers are saved.

In this embodiment, by rating positioning results for a similar face, and then selecting a positioning result satisfying a second condition from the positioning results and determining a positioning result for a target face according to the selected positioning result, positioning precision of key points of the target face is further improved.

Figure 4:
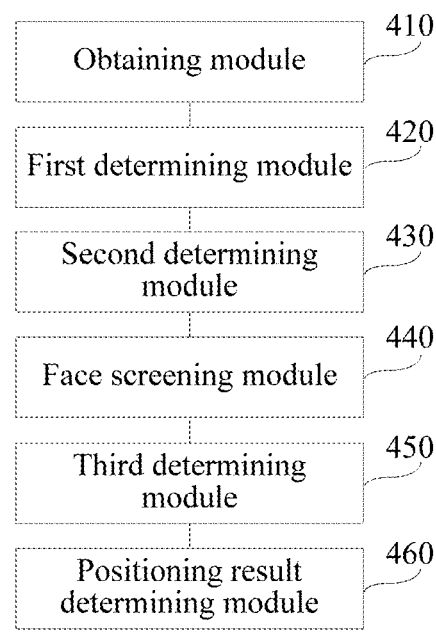
FIG. 4 is a structural block diagram of a face key point positioning apparatus according to an embodiment of the present invention.

Referring to FIG. 4, FIG. 4 is a structural block diagram of a face key point positioning apparatus according to an embodiment of the present invention. The face key point positioning apparatus may include: an obtaining module 410, a first determining module 420, a second determining module 430, a face screening module 440, a third determining module 450, and a positioning result determining module 460.

The obtaining module 410 is configured to obtain a face image.

The first determining module 420 is configured to recognize a face frame in the face image obtained by the obtaining module 410.

The second determining module 430 is configured to determine positions of n key points of a target face in the face frame according to the face frame determined by the first determining module 420 and a first positioning algorithm, n≥3, and the first positioning algorithm being a positioning algorithm that allows deviations between the obtained positioned positions of the key points and actual positions thereof to fall within a first deviation range when the face frame is positioned with a deviation.

The face screening module 440 is configured to perform screening to select, from candidate faces, a similar face whose positions of corresponding key points match the positions of the n key points of the target face.

The third determining module 450 is configured to determine positions of m key points of the similar face selected through screening according to a second positioning algorithm, m being a positive integer, and the second positioning algorithm being a positioning algorithm that allows deviations between the obtained positioned positions of the key points and actual positions thereof to fall within a second deviation range when the face frame is accurately positioned.

The positioning result determining module 460 is configured to determine a positioning result for the target face according to a positioning result for the similar face that is determined by the third determining module 450.

To sum up, by means of the face key point positioning apparatus provided in this embodiment, a face frame in a face image is recognized; n key points of a target face in the face frame are positioned according to a first positioning algorithm that allows positioning deviations of the key points to fall within a first deviation range when the face frame is positioned with a deviation; a similar face whose positions of corresponding key points match positioned positions of the n key points is selected from candidate faces through screening; then, positions of key points of the similar face are positioned according to a second positioning algorithm that allows positioning deviations of the key points to fall within a second deviation range when the face frame is accurately positioned; and a positioning result for the target face is determined according to a positioning result for the similar face. In this way, the problem that positions of key points obtained by a terminal have relatively great deviations in the related technologies is resolved, thereby achieving an effect of improving accuracy of positioned positions of the key points.

Figure 5:
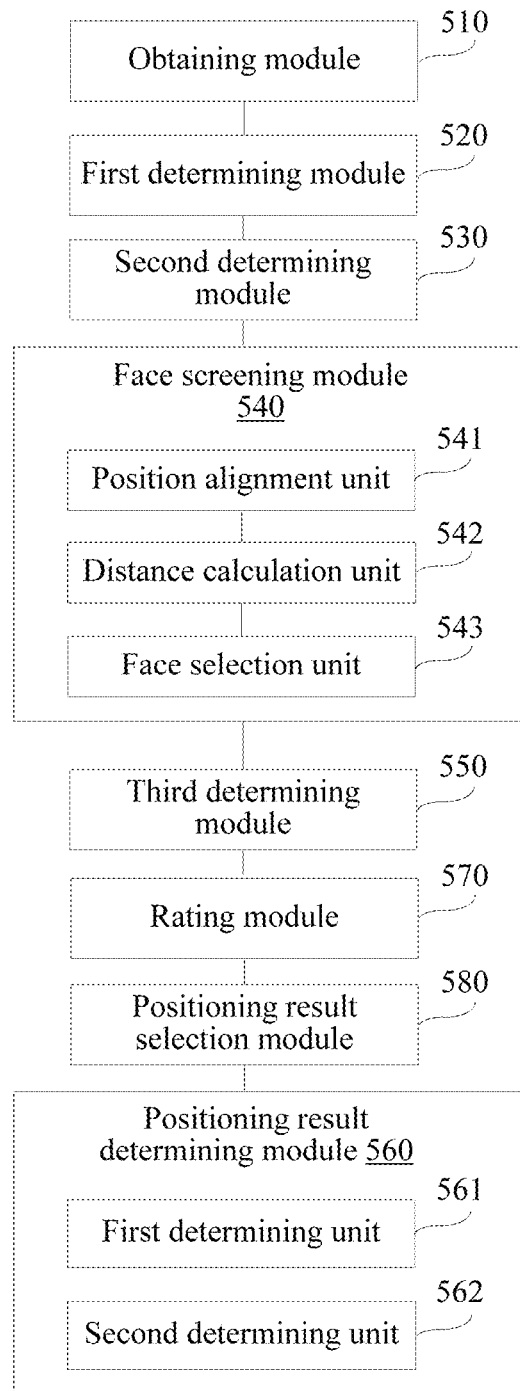
FIG. 5 is a structural block diagram of a face key point positioning apparatus according to another embodiment of the present invention.

Referring to FIG. 5, FIG. 5 is a structural block diagram of a face key point positioning apparatus according to an embodiment of the present invention. The face key point positioning apparatus may include: an obtaining module 510, a first determining module 520, a second determining module 530, a face screening module 540, a third determining module 550, and a positioning result determining module 560.

The obtaining module 510 is configured to obtain a face image.

The first determining module 520 is configured to recognize a face frame in the face image obtained by the obtaining module 510.

The second determining module 530 is configured to determine positions of n key points of a target face in the face frame according to the face frame determined by the first determining module 520 and a first positioning algorithm, n≥3, and the first positioning algorithm being a positioning algorithm that allows deviations between the obtained positioned positions of the key points and actual positions thereof to fall within a first deviation range when the face frame is positioned with a deviation.

The face screening module 540 is configured to perform screening to select, from candidate faces, a similar face whose positions of corresponding key points match the positions of the n key points of the target face.

The third determining module 550 is configured to determine positions of m key points of the similar face selected through screening according to a second positioning algorithm, m being a positive integer, and the second positioning algorithm being a positioning algorithm that allows deviations between the obtained positioned positions of the key points and actual positions thereof to fall within a second deviation range when the face frame is accurately positioned.

The positioning result determining module 560 is configured to determine a positioning result for the target face according to a positioning result for the similar face that is determined by the third determining module 550.

Optionally, the face screening module 540 includes:

a position alignment unit 541, configured to align, for each candidate face, positions of i key points of the n key points of the target face with positions of corresponding key points of the candidate face, where a position of each of the n key points is marked in each candidate face, and i<n;

a distance calculation unit 542, configured to calculate a distance between a remaining key point of the n key points and a position of a corresponding key point of the candidate face; and a face selection unit 543, configured to select a similar face satisfying a first condition from the candidate faces, where the first condition includes: the distance being less than a first threshold, or ranking the bottom N after ranking is performed in descending order by distance, or ranking the top N after ranking is performed in ascending order by distance, N being a positive integer.

Optionally, the positioning result determining module 560 includes:

a first determining unit 561, configured to: when there is one positioning result, determine that the positioning result for the similar face is the positioning result for the target face; and a second determining unit 561, configured to: when there are at least two positioning results, calculate a central position of at least two positions of each key point according to positions of key points in the at least two positioning results; determine that the calculated central position is a target position of the key point; and determine that a positioning result constituted by target positions of the key points is the positioning result for the target face.

Optionally, the apparatus further includes:

a rating module 570, configured to rate the positioning result according to a preset evaluation algorithm and the target face, where there is a negative correlation between the rating and an error between the positioning result and the target face; and a positioning result selection module 580, configured to select a positioning result satisfying a second condition from the positioning result, where the second condition includes: a rating being higher than a second threshold, or ranking the top M after ranking is performed in descending order by rating, or ranking the bottom M after ranking is performed in ascending order by rating, M being a positive integer.

Optionally, the first positioning algorithm is a CNN algorithm, an ASM algorithm, an AAM algorithm, or an SDM algorithm.

The second positioning algorithm is an ESR algorithm, the CNN algorithm, or the SDM algorithm.

To sum up, by means of the face key point positioning apparatus provided in this embodiment, a face frame in a face image is recognized; n key points of a target face in the face frame are positioned according to a first positioning algorithm that allows positioning deviations of the key points to fall within a first deviation range when the face frame is positioned with a deviation; a similar face whose positions of corresponding key points match positioned positions of the n key points is selected from candidate faces through screening; then, positions of key points of the similar face are positioned according to a second positioning algorithm that allows positioning deviations of the key points to fall within a second deviation range when the face frame is accurately positioned; and a positioning result for the target face is determined according to a positioning result for the similar face. In this way, the problem that positions of key points obtained by a terminal have relatively great deviations in the related technologies is resolved, thereby achieving an effect of improving accuracy of positioned positions of the key points.

In this embodiment, initial positioning is performed by using a first positioning algorithm, and then second positioning is performed by using a second positioning algorithm, so that on the premise of some degree of positioning accuracy ensured by the initial positioning, positions of key points positioned according to the second positioning algorithm are also relatively accurate.

Although the first positioning algorithm still has some degree of positioning precision when a face frame is positioned with a deviation, positioning complexity of the first positioning algorithm generally increases with a quantity of key points needed to positioned. Although the second positioning algorithm has relatively favorable positioning precision when a face frame is accurately positioned and has a relatively great positioning error when the face frame is positioned with a deviation, a quantity of key points that can be positioned according to the second positioning algorithm can be adjusted as needed. Therefore, in this embodiment, positioning is performed by using both the first positioning algorithm and the second positioning algorithm, not only ensuring some degree of positioning precision, but also ensuring that a quantity of key points needed to be positioned can be flexibly adjusted in the positioning method, and thereby improving flexibility of the foregoing face key point positioning method.

In addition, when the first positioning algorithm or the second positioning algorithm is an algorithm with randomness, when a terminal trains a positioning model of the positioning algorithm, the terminal may select a small quantity of training faces, and then perform training by positioning a same training face for multiple times. In this way, the requirement for a quantity of training samples in a training process is reduced, complexity of manually marking key points of training faces is decreased, and manpower costs of trainers are saved.

In this embodiment, by rating positioning results for a similar face, and then selecting a positioning result satisfying a second condition from the positioning results and determining a positioning result for a target face according to the selected positioning result, positioning precision of key points of the target face is further improved.

In an exemplary embodiment, a non-transitory computer readable storage medium containing instructions is further provided, for example, a memory containing instructions, where the instructions may be executed by a processor of a mobile terminal to perform the foregoing face key point positioning method. For example, the non-transitory computer readable storage medium may be a read-only memory (ROM), a random access memory (RAM), a compact disc read-only memory (CD-ROM), a magnetic tape, a soft disk, an optical data storage device, or the like.

It should be noted that, the division of the above functional modules is merely described for exemplary purposes when the face key point positioning apparatus provided in the foregoing embodiments positions key points of a face. In actual applications, the functions may be allocated to different functional modules according to specific needs, that is, dividing the internal structure of the apparatus into different functional modules to complete all or some of the above described functions. In addition, the face key point positioning apparatus provided in the foregoing embodiments is based on the same concept as the face key point positioning method in the foregoing embodiments. For a specific implementation process, refer to the method embodiments, and details are not described herein again.

The serial numbers of the foregoing embodiments of the present invention serve for a description purpose only, and do not indicate the superiority or inferiority of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for determining positions of face key points, performed by a device, wherein the device comprises a memory storing instructions and at least one processor in communication with the memory to execute the instructions, the method comprising:

obtaining, by the device, a face image;

recognizing, by the device, a face frame in the face image;

determining, by the device, positions of n key points of a target face in the face frame according to the face frame and a first positioning algorithm, wherein n≥3 and the first positioning algorithm allows deviations between the determined positions of the n key points and actual positions of the n key points of the target face to fall within a first deviation range, when the face frame is positioned with a deviation;

performing, by the device, screening to select, from candidate faces, a similar face whose positions of corresponding key points match the positions of the n key points of the target face;

determining, by the device, positions of m key points of the similar face according to a second positioning algorithm, wherein m is a positive integer and the second positioning algorithm allows deviations between the determined positions of the m key points and actual positions of the m key points of the similar face to fall within a second deviation range, when the face frame is accurately positioned; and determining, by the device, a positioning result for the target face according to at least one positioning result for the similar face.

2. The method according to claim 1, wherein before the determining, by the device, the positioning result for the target face according to the at least one positioning result for the similar face, the method further comprises:

rating, by the device, the at least one positioning result for the similar face according to a preset evaluation algorithm and the target face, wherein there is a negative correlation between a rated value and an error between the at least one positioning result for the similar face and the target face; and selecting, by the device, a positioning result satisfying a second condition from the at least one positioning result for the similar face, wherein the second condition comprises one of:

the rated value being higher than a second threshold, top M rated values when ranking is performed in descending order by the rated value, or bottom M rated values when ranking is performed in ascending order by the rated value, M being a positive integer.

3. The method according to claim 1, wherein:

the first positioning algorithm comprises at least one of a Convolutional Neural Network (CNN) algorithm, an Active Shape Model (ASM) algorithm, an Active Appearance Model (AAM) algorithm, or a Supervised Descent Method (SDM) algorithm.

4. The method according to claim 1, wherein the performing, by the device, screening to select, from the candidate faces, the similar face whose positions of the corresponding n key points match the positions of the n key points of the target face comprises:

aligning, by the device, for each candidate face of the candidate faces, positions of i key points of the n key points of the target face with positions of corresponding i key points of the each candidate face, wherein a position of each of the n key points is marked in each candidate face, and i<n;

calculating, by the device, a distance between a remaining key point of the n key points and a position of a corresponding key point of the each candidate face; and performing, by the device, screening to select a face satisfying a first condition from the candidate faces as the similar face, wherein the first condition comprises one of:

the calculated distance being less than a first threshold, bottom N calculated distances when ranking is performed in descending order by the calculated distance, or top N calculated distances when ranking is performed in ascending order by the calculated distance, N being a positive integer.

5. The method according to claim 4, wherein before the determining, by the device, the positioning result for the target face according to the at least one positioning result for the similar face, the method further comprises:

rating, by the device, the at least one positioning result for the similar face according to a preset evaluation algorithm and the target face, wherein there is a negative correlation between a rated value and an error between the at least one positioning result for the similar face and the target face; and selecting, by the device, a positioning result satisfying a second condition from the at least one positioning result for the similar face, wherein the second condition comprises one of:

the rated value being higher than a second threshold, top M rated values when ranking is performed in descending order by the rated value, or bottom M rated values when ranking is performed in ascending order by the rated value, M being a positive integer.

6. The method according to claim 4, wherein:

the first positioning algorithm comprises at least one of a Convolutional Neural Network (CNN) algorithm, an Active Shape Model (ASM) algorithm, an Active Appearance Model (AAM) algorithm, or a Supervised Descent Method (SDM) algorithm.

7. The method according to claim 1, wherein the determining, by the device, the positioning result for the target face according to the at least one positioning result for the similar face comprises:

when there is one positioning result for the similar face, determining, by the device, that the positioning result for the similar face is the positioning result for the target face; and when there are at least two positioning results for the similar face, calculating, by the device, a central position of at least two positions of each key point in the at least two positioning results for the similar face, determining that the calculated central position is a target position of the each key point, and determining that a positioning result constituted by the target position of the each key point is the positioning result for the target face.

8. The method according to claim 7, wherein before the determining, by the device, the positioning result for the target face according to the at least one positioning result for the similar face, the method further comprises:

rating, by the device, the at least one positioning result for the similar face according to a preset evaluation algorithm and the target face, wherein there is a negative correlation between a rated value and an error between the at least one positioning result for the similar face and the target face; and selecting, by the device, a positioning result satisfying a second condition from the at least one positioning result for the similar face, wherein the second condition comprises one of:

the rated value being higher than a second threshold, top M rated values when ranking is performed in descending order by the rated value, or bottom M rated values when ranking is performed in ascending order by the rated value, M being a positive integer.

9. The method according to claim 7, wherein:

the first positioning algorithm comprises at least one of a Convolutional Neural Network (CNN) algorithm, an Active Shape Model (ASM) algorithm, an Active Appearance Model (AAM) algorithm, or a Supervised Descent Method (SDM) algorithm.

10. The method according to claim 1, wherein:

the second positioning algorithm comprises at least one of an Explicit Shape Regression (ESR) algorithm, a Convolutional Neural Network (CNN) algorithm, or a Supervised Descent Method (SDM) algorithm.

11. A terminal, comprising:

one or more processors;

a memory in communication with the one or more processors; and one or more programs being stored in the memory, wherein, when the one or more programs are configured to be executed by the one or more processors, the one or more processors are configured to cause the terminal to perform:

obtaining a face image;

recognizing a face frame in the face image;

determining positions of n key points of a target face in the face frame according to the face frame and a first positioning algorithm, wherein n≥3 and the first positioning algorithm allows deviations between the determined positions of the n key points and actual positions of the n key points of the target face to fall within a first deviation range, when the face frame is positioned with a deviation;

performing screening to select, from candidate faces, a similar face whose positions of corresponding key points match the positions of the n key points of the target face;

determining positions of m key points of the similar face according to a second positioning algorithm, wherein m is a positive integer and the second positioning algorithm allows deviations between the determined positions of the m key points and actual positions of the m key points of the similar face to fall within a second deviation range when the face frame is accurately positioned; and determining a positioning result for the target face according to at least one positioning result for the similar face.

12. The terminal according to claim 11, wherein, when the one or more programs are configured to be executed by the one or more processors, the one or more processors are configured to further cause the terminal to perform:

rating the at least one positioning result for the similar face according to a preset evaluation algorithm and the target face, wherein there is a negative correlation between a rated value and an error between the at least one positioning result for the similar face and the target face; and selecting a positioning result satisfying a second condition from the at least one positioning result for the similar face, wherein the second condition comprises one of:
the rated value being higher than a second threshold,
top M rated values when ranking is performed in descending order by the rated value, or
bottom M rated values when ranking is performed in ascending order by the rated value, M being a positive integer.

13. The terminal according to claim 11, wherein:
the first positioning algorithm comprises at least one of a Convolutional Neural Network (CNN) algorithm, an Active Shape Model (ASM) algorithm, an Active Appearance Model (AAM) algorithm, or a Supervised Descent Method (SDM) algorithm.

14. The terminal according to claim 11, wherein, when the one or more processors are configured to cause the terminal to perform the performing screening to select, from the candidate faces, the similar face whose positions of corresponding key points match the positions of the n key points of the target face, the one or more processors are configured to cause the terminal to perform:
aligning, for each candidate face of the candidate faces, positions of i key points of the n key points of the target face with positions of corresponding i key points of the each candidate face, wherein a position of each of the n key points is marked in each candidate face, and i<n;
calculating a distance between a remaining key point of the n key points and a position of a corresponding key point of the each candidate face; and
performing screening to select a face satisfying a first condition from the candidate faces as the similar face, wherein the first condition comprises one of:
the calculated distance being less than a first threshold,
bottom N calculated distances when the ranking is performed in descending order by the calculated distance, or
top N calculated distances when the ranking is performed in ascending order by the calculated distance, N being a positive integer.

15. The terminal according to claim 14, wherein, when the one or more programs are configured to be executed by the one or more processors, the one or more processors are configured to further cause the terminal to perform:
rating the at least one positioning result for the similar face according to a preset evaluation algorithm and the target face, wherein there is a negative correlation between a rated value and an error between the at least one positioning result for the similar face and the target face; and
selecting a positioning result satisfying a second condition from the at least one positioning result for the similar face, wherein the second condition comprises one of:
the rated value being higher than a second threshold,
top M rated values when ranking is performed in descending order by the rated value, or
bottom M rated values when ranking is performed in ascending order by the rated value, M being a positive integer.

16. The terminal according to claim 14, wherein:
the first positioning algorithm comprises at least one of a Convolutional Neural Network (CNN) algorithm, an Active Shape Model (ASM) algorithm, an Active Appearance Model (AAM) algorithm, or a Supervised Descent Method (SDM) algorithm.

17. The terminal according to claim 11, wherein, when the one or more processors are configured to cause the terminal to perform the determining the positioning result for the target face according to the at least one positioning result for the similar face, the one or more processors are configured to cause the terminal to perform:
when there is one positioning result for the similar face, determining that the positioning result for the similar face is the positioning result for the target face; and
when there are at least two positioning results for the similar face, calculating a central position of at least two positions of each key point in the at least two positioning results for the similar face, determining that the calculated central position is a target position of the each key point, and determining that a positioning result constituted by the target position of the each key point is the positioning result for the target face.

18. The terminal according to claim 17, wherein, when the one or more programs are configured to be executed by the one or more processors, the one or more processors are configured to further cause the terminal to perform:
rating the at least one positioning result for the similar face according to a preset evaluation algorithm and the target face, wherein there is a negative correlation between a rated value and an error between the at least one positioning result for the similar face and the target face; and
selecting a positioning result satisfying a second condition from the at least one positioning result for the similar face, wherein the second condition comprises one of:
the rated value being higher than a second threshold,
top M rated values when ranking is performed in descending order by the rated value, or
bottom M rated values when ranking is performed in ascending order by the rated value, M being a positive integer.

19. The terminal according to claim 17, wherein:
the first positioning algorithm comprises at least one of a Convolutional Neural Network (CNN) algorithm, an Active Shape Model (ASM) algorithm, an Active Appearance Model (AAM) algorithm, or a Supervised Descent Method (SDM) algorithm.

20. The terminal according to claim 11, wherein:
the second positioning algorithm comprises at least one of an Explicit Shape Regression (ESR) algorithm, a Convolutional Neural Network (CNN) algorithm, or a Supervised Descent Method (SDM) algorithm.

* * * * *